INVENTOR
Benjamin C. Smith
BY
Miller Brothers
ATTORNEYS

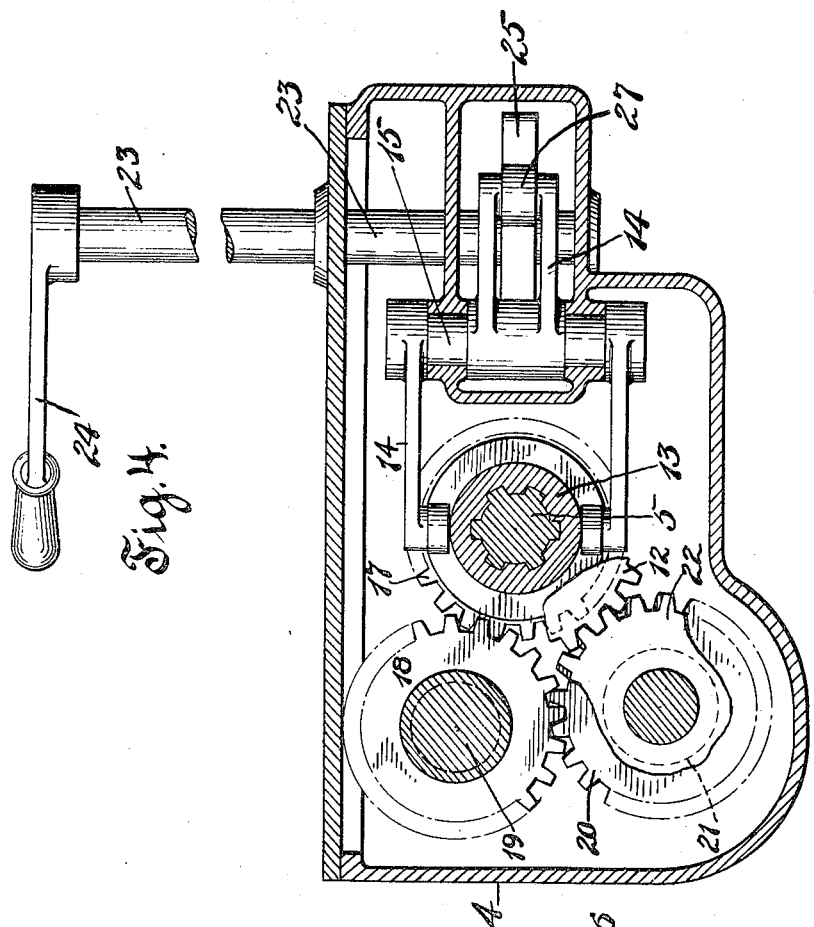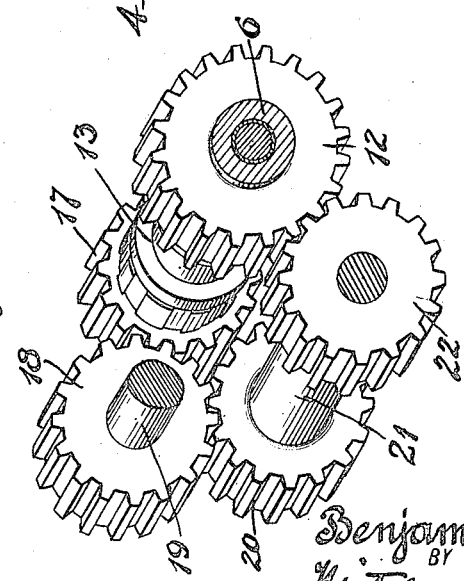

Patented July 31, 1923.

1,463,445

UNITED STATES PATENT OFFICE.

BENJAMIN C. SMITH, OF WESTFIELD, NEW JERSEY, ASSIGNOR TO STANDARD MOTOR CONSTRUCTION COMPANY, OF JERSEY CITY, NEW JERSEY, A CORPORATION OF NEW JERSEY.

POWER-TRANSMISSION MECHANISM.

Application filed November 25, 1922. Serial No. 603,150.

*To all whom it may concern:*

Be it known that I, BENJAMIN C. SMITH, a citizen of the United States of America, residing at Westfield, New Jersey, have invented a new and useful Power-Transmission Mechanism, of which the following is a specification.

My invention relates to certain new and useful improvements in power transmission mechanism for carrying power from a motor to the driven element, for example, the propeller wheel of a vessel.

The invention relates more particularly to the operating means for coupling the driven shaft with the driving shaft for forward speed, for disengaging said parts, as well as motor for idling, and for coupling said parts in another position for reversing the direction of rotation of the driven shaft. These ends are accomplished by means of a single manually operable lever which, when moved into one position couples the driving and the driven shafts for rotation in the same direction; and, when moved into another position, couples said shafts for relatively reverse rotation; and, when moved to a third position, not only disengages said shafts from each other but also disengages the motor from the driving shaft, so that all parts may turn idly.

These and other advantages will be fully understood by a mechanic skilled in the art, from a reading of the following description and an examination of the accompanying drawings, in which:

Fig. 4 is a vertical sectional view illustrating certain parts.

Fig. 5 is a perspective view of the gears.

Figure 1:
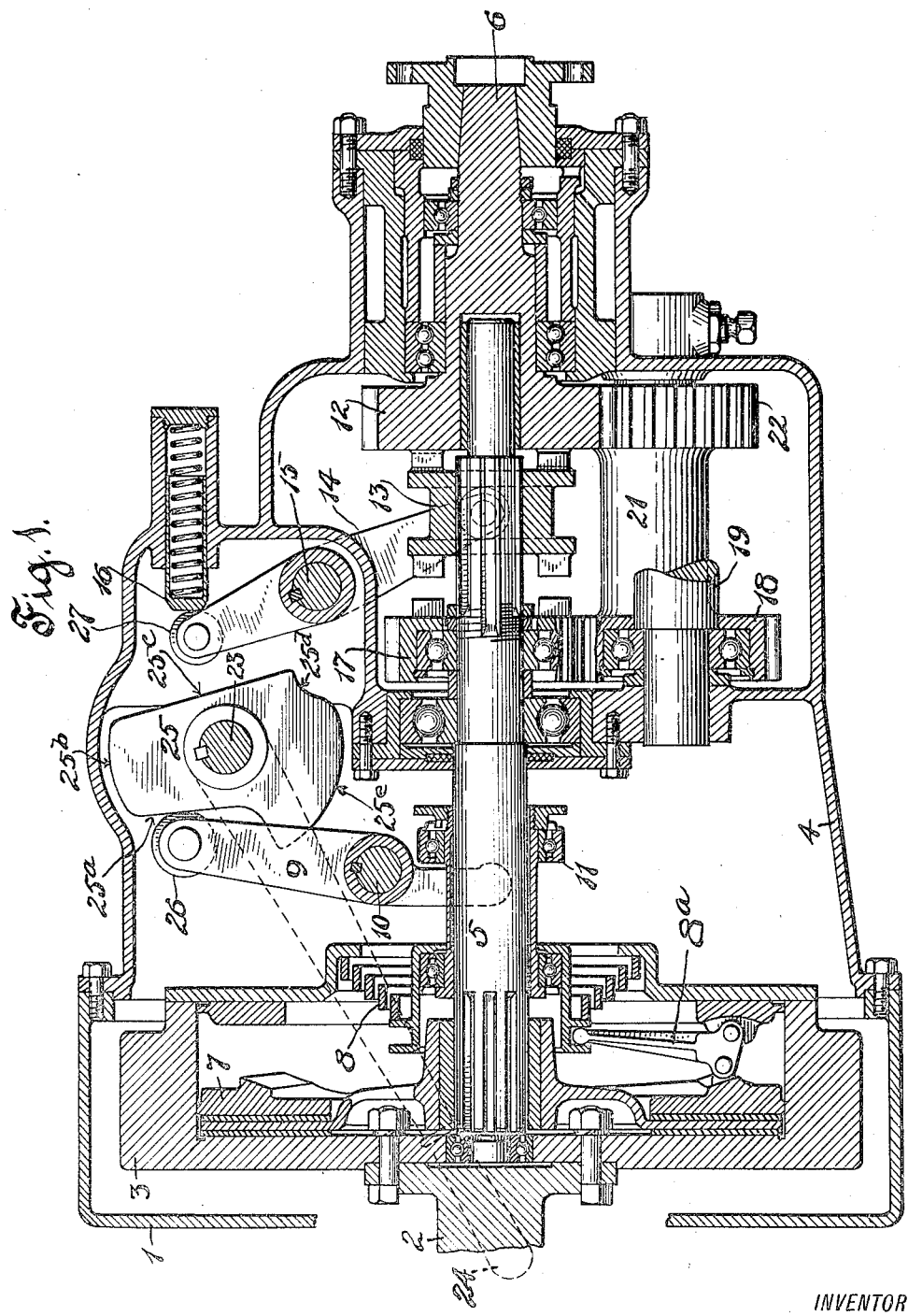
Figure 1 is a horizontal sectional view illustrating such parts as are necessary to a full understanding of my invention.
Figure 2:
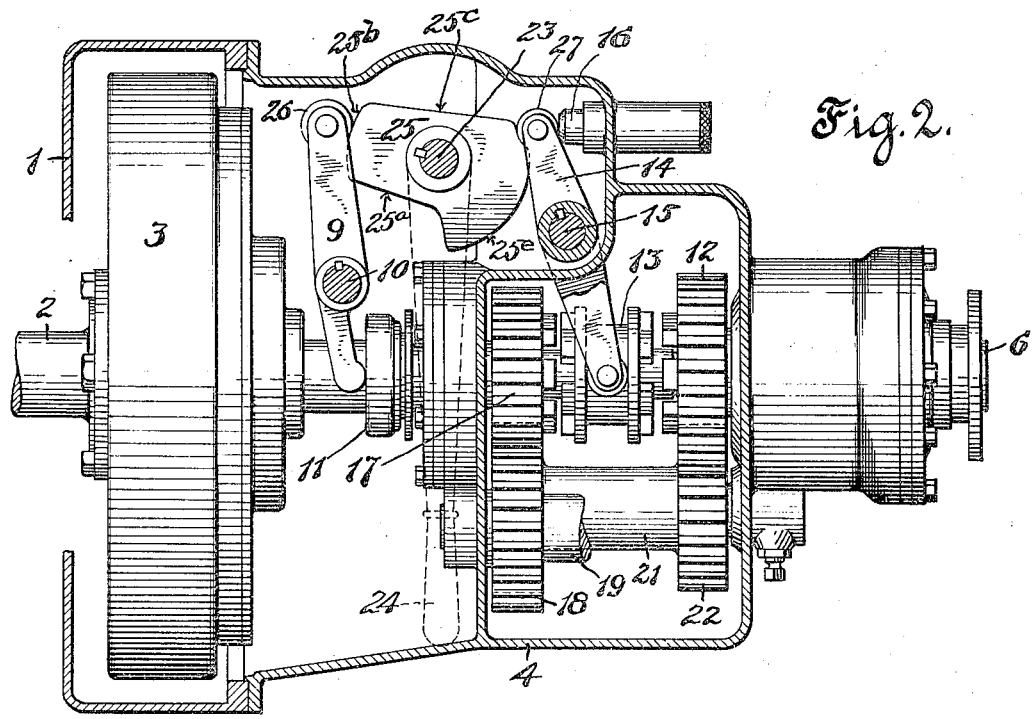
Fig. 2 is a horizontal plan view, partly in section, showing the working parts in a different position from that illustrated in Fig. 1, such view being somewhat reduced in scale relatively to the previous view.

1 represents the fly wheel housing of a motor frame. 2 represents the end of the motor shaft, upon which is mounted a fly wheel 3. 4 is a transmission housing rigidly connected to the fly wheel housing, but so that the various parts will be carried as a unit with the engine case, thereby insuring at all times accurate alignment. 5 represents the driving shaft. 6 represents the driven shaft. 7 represents a fly wheel clutch of any suitable design, a clutch of the friction disc type being shown. The movable clutch element is splined upon the driving shaft 5 and is normally pressed in a direction to engage with the fly wheel 3 by means of a powerful spring 8 and toggles 8ª. 9 is an engine clutch shifting lever mounted on the shaft 10, which lever has jaws engaging a collar 11, so that, when the lever 9 is swung from the position shown in Fig. 1 to that shown in Fig. 2, it will shift the movable clutch element to disengage it from the fly wheel allowing the engine to run idly. 12 is a gear fixed on the driven shaft 6. 13 is a clutch in the form of a sleeve mounted to slide, but not turn, upon the rear end of the driving shaft 5. 17 is a gear mounted to turn freely upon the driving shaft 5. The sliding clutch 13 is located between the gears 12—17 and has jaws at its opposite ends which may be engaged alternately with corresponding jaws on said gears 12—17 respectively. 14 is a shifting device in the form of a lever pivoted at 15 and suitably formed to engage the clutch 13 and move it. 16 is a spring pressed plunger which yielding presses the shifting lever 14 in one direction. 18 is a gear which meshes with the gear 17 at all times. The gear 18 is mounted on a shaft 19. 20 (see Fig. 5) is a gear meshing with gear 18, and mounted on a shaft 21. 22 is another gear fixed on shaft 21 and which meshes with the gear 12 on the driven shaft 6. It will be observed that the gear 20 does not mesh with the gear 17. It is apparent that when the sleeve 13 has been disengaged from the gear 12 and shifted into engagement with the gear 17, said train of gears will produce a reverse rotation of the driven shaft 6.

The controlling means for operating these various parts is under manual control, and comprises a shaft 23, which, in marine construction, would preferably project vertically up to a point where the person in control is stationed. On this shaft 23 is fixed a lever 24. Mounted on the shaft within the transmission housing 4 and facing the ends of the levers 9—14 is a peculiarly-shaped cam 25. The adjacent ends of the levers 9—14 are preferably provided with anti-friction rollers 26, 27, respectively, with which the cam engages. This cam is so shaped as to function in the following manner. When the cam stands in the position shown in Fig. 1, the various parts are coupled up for forward drive, that is to say, the driven shaft 6 will be connected with the fly wheel 3 of the engine through the medium of the clutch sleeve 13 and the fly wheel clutch 7. The hand-operated lever 24 preferably stands in a forward position at this time, indicating by said position that the parts are coupled for forward drive, or "go ahead." Now assume the person in charge desires to disconnect the parts so that the engine may run idly. To do this, he pulls the lever 24 backward from the position shown in dotted lines in Fig. 1 toward that shown in dotted lines in Fig. 2. The first part of this movement swings the cam 25, so that the incline 25$^a$ thereon will push against the roller 26, swinging the lever 9 so as to disengage the fly wheel clutch 7 from the motor as a preliminary step. When this disengagement is effected, a high arc-shaped portion 25$^b$ on the cam rests against the roller 26, so as to hold the fly wheel clutch disengaged for a period, determined by the length of said arc. During the preliminary movement an opposite cam incline 25$^c$ will engage the roller 27, so as to swing the lever 14 into the position shown in Fig. 2, so that the clutch sleeve 13 will be disengaged from the gear 12. When the clutch sleeve 13 is disengaged from both gears 12 and 17 the roller 27 will drop into a notch 25$^d$ in the edge of the cam 25 (see Fig. 2) and this will occur while the roller 26 still rides upon the arc-shaped high part 25$^b$. Inasmuch as the roller 27 now stands in the notch 25$^d$ and is held therein by the spring pressed plunger 12, it follows that the lever 24 will remain in that position until manually shifted. During such time as the transmission mechanism is disconnected or free, the engine may also run idly as the fly wheel clutch is "out." It is in this position that the parts are placed in the starting up of the engine, at which time a minimum of resistance to the turning of the engine is desirable.

Figure 3:
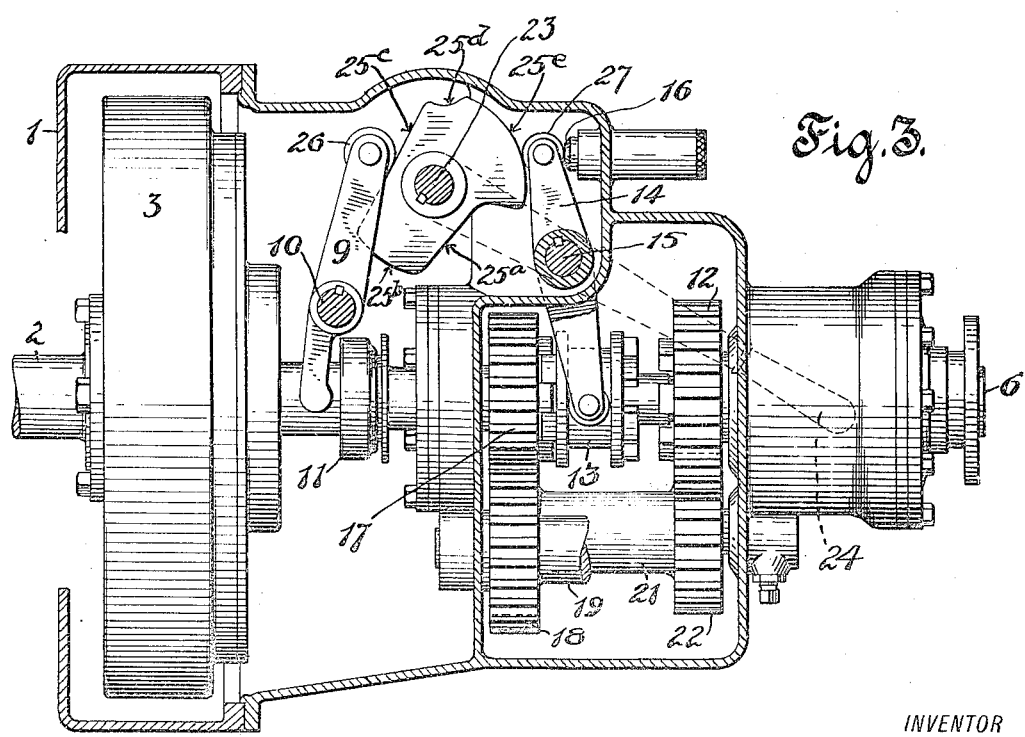
Fig. 3 is a view similar to Fig. 2, but showing the parts in a still different position.

Now, assuming it is desired to connect the engine with the driven shaft for forward drive. The handle 24 is pushed forwardly so as to restore the parts to the position shown in Fig. 1. On the other hand, if it is desired to reverse the direction of rotation of the driven shaft 6 relatively to the engine and the driving shaft 5, the handle 24 is pulled back from the position shown in Fig. 2 to that indicated in Fig. 3. This causes the cam 25 to swing so that the roller 27 will first ride up onto a second high arc-shaped part 25$^e$ of the cam which swings the lever 14 in a direction to cause the clutch jaws on the forward side of the clutch sleeve to engage with the complementary clutch jaws on the gear 17. As soon as this engagement is effected the roller 26 will leave the high part 25$^b$ of the cam and will ride down the incline 25$^c$ thereof, thus allowing the spring 8 to force the elements of the fly wheel clutch 7 into driving engagement with the fly wheel to couple in the motor. This will cause the driving shaft 5 to be rotated, which in turn (through the gears 17, 18, 20, 21 and 12) will cause the driven shaft 6 to be driven in a reverse direction.

By the aforesaid very simple arrangement an operator may have positive and sure control of the mechanism for "go ahead" and "reverse" motion, with an intermediate idle or neutral position wherein all the parts are disconnected or free. It will be noted that the movement of the fly wheel clutch 7 is so timed by the cam 25 that it is disengaged before the jaws of the clutch sleeve 13 are disengaged from the jaws on the gear 12 or 17, thereby avoiding drag and improper wear. The timing of the operation of the fly wheel clutch is also such that when the jaws on the clutch sleeve 13 are brought into engagement with either of the gears 12 or 17, the motor is free of the driving shaft 5, thus avoiding danger of injurious clash and breakage. As soon as the transmission clutch jaws have been sufficiently entered or engaged, the fly wheel clutch is caused to take hold so as to drive the driven shaft in a forward or reverse direction, according to the position of the cam 25.

While I have illustrated the fly wheel clutch as that of the well known "disk" type, obviously I do not wish to be limited to the use of that particular species. So, also, in various details the transmission mechanism may be modified substantially, without departing from the spirit or scope of my invention. There are many minor details that I have not deemed it necessary to describe, such as the provision of anti-friction bearings both radial and thrust between the various working parts, but these are all well understood and do not require specific description.

I claim:

1. In a power transmission mechanism, a driving shaft, a motor clutch therefor, a driven shaft, a train of reversing gears leading from the driving to the driven shaft, said train being normally free of one of said shafts, a sliding clutch, shifting means for said sliding clutch for moving the latter into one position to connect said driving and driven shafts for like rotation and for moving said sliding clutch into another position for connecting said reversing gear train with both of said shafts for reverse rotation of said driven shaft, shifting means for said motor clutch, and a manually operable means co-acting with both of said shifting means and operating to release the motor clutch preparatory to releasing the sliding clutch and to cause the motor clutch to move into clutch engagement after the sliding clutch has been moved into either of its aforesaid operative positions, said manually operable means comprising a cam having two separate inclined portions for operating on the aforesaid shifting means, with two high neutral portions for holding one of said shifting means in a certain position for certain times while said cam is operating upon the other shifting means.

2. In a power transmission mechanism, a driving shaft, a motor clutch therefor, a driven shaft, a train of reversing gears leading from the driving to the driven shaft, said train being normally free of one of said shafts, a sliding clutch, shifting means for said sliding clutch for moving the latter into one position to connect said driving and driven shafts for like rotation and for moving said sliding clutch into another position for connecting said reversing gear train with both of said shafts for reverse rotation of said driven shaft, shifting means for said motor clutch, and a manually operable means co-acting with both of said shifting means and operating to release the motor clutch preparatory to releasing the sliding clutch and to cause the motor clutch to move into clutch engagement after the sliding clutch has been moved into either of its aforesaid operative positions, said manually operable means comprising a single cam having two oppositely arranged inclines for moving said shifting means, respectively, from one position to another in proper time, and having two intermediate high portions for respectively holding one of said shifting means in a relatively fixed position while one of said inclines is moving the other shifting means.

3. A transmission mechanism comprising the characteristics set forth in claim 1, the said cam having in its periphery a recess or notch into which one of said shifting means projects, the sides of said notch holding said cam at such a time against rotation.

4. In a power transmission mechanism, a driving shaft, a driven shaft, a motor clutch slidable but non-rotatable on said driving shaft, another clutch also slidable but non-rotatable upon said driving shaft, separate means for shifting said clutches to and fro, manually operable means for moving said shifting means comprising a cam having two separate portions for moving said shifting means respectively and two separate high parts for holding said shifting means respectively in certain positions, said cam being shaped between one of said portions and one of said high parts for engaging a part of one of said shifting means to hold the several parts in a neutral or idle position.

5. A power transmission mechanism including, a driving shaft, a driven shaft in line therewith, a motor clutch slidable but non-rotatable on the driving shaft, a spring for moving said clutch in one direction thereon, another clutch also slidable but non-rotatable upon said driving shaft and a spring for moving the same in one direction thereon, shifting devices for moving both of said clutches in a direction opposite to the action of said springs, and a cam having two separate portions for moving said shifting devices against the tension of the aforesaid springs, said cam having two substantially arc-shaped parts intermediate said operating portions to hold said shifting devices respectively in certain predetermined positions during certain predetermined movements of the cam.

6. A power transmission mechanism including, a driving shaft, a driven shaft in line therewith, a motor clutch slidable but non-rotatable on the driving shaft, a spring for moving said clutch in one direction thereon, another clutch also slidable but non-rotatable upon said driving shaft and a spring for moving the same in one direction thereon, shifting devices for moving both of said clutches in a direction opposite to the action of said springs, and a cam having two separate portions for moving said shifting devices against the tension of the aforesaid springs, said cam having two substantially arc-shaped parts intermediate said operating portions to hold said shifting devices respectively in certain predetermined positions during certain predetermined movements of the cam, said cam having a notch, one of said shifting devices co-acting with said cam while in said notch to hold said parts in a neutral position.

7. In a power transmission mechanism, a driving shaft, a driven shaft, a motor clutch slidable but non-rotatable on said driving shaft, another clutch also slidable but non-rotatable upon said driving shaft, separate means for shifting said clutches to and fro, manually operable means for moving said shifting means comprising a cam having two separate portions for moving said shifting means respectively and two separate high parts for holding said shifting means respectively in certain positions, said cam being shaped between one of said portions and one of said high parts for engaging a part of one of said shifting means to hold the several parts in a neutral or idle position, a train of reversing gears connecting said shafts, the gear on the driving shaft being normally free to turn thereon, the second mentioned clutch when in one position operating to operatively connect the driving and the driven shaft, and when in another position to operatively engage the reversing gear on the driving shaft, and when in a third position to be free of both the driven shaft and said reversing gear.

8. A power transmission mechanism including a driving and a driven shaft, a motor clutch slidable but non-rotatable upon the driving shaft and normally spring pressed in a direction to couple the motor with said driving shaft, a second clutch also slidable but non-rotatable upon said driving shaft and normally spring pressed in a direction to connect the driving shaft with the driven shaft for rotation in the same direction, a train of reversing gears between the driving and the driven shafts including one gear free to rotate on the driving shaft when the second mentioned clutch is disconnected from said gear, a single manually operable means for moving said clutches in opposition to the springs, said manually operable means moving the motor clutch in a direction to free it from the motor in advance of disconnecting the second clutch from the driving shaft and for holding said motor shaft disconnected from the motor while said second clutch is being withdrawn from driven shaft engagement and shifted to reversing gear engagement, said means permitting said motor clutch to again move into motor engaging position after the second clutch has been connected with said reversing gear.

9. A power transmission mechanism including a driving and a driven shaft, a motor clutch slidable but non-rotatable upon the driving shaft and normally spring pressed in a direction to couple the motor with said driving shaft, a second clutch also slidable but non-rotatable upon said driving shaft and normally spring pressed in a direction to connect the driving shaft with the driven shaft for rotation in the same direction, a train of reversing gears between the driving and the driven shafts including one gear free to rotate on the driving shaft when the second mentioned clutch is disconnected from said gear, a single manually operable means for moving said clutches in opposition to the springs, said manually operable means moving the motor clutch in a direction to free it from the motor in advance of disconnecting the second clutch from the driving shaft and for holding said motor shaft disconnected from the motor while said second clutch is being withdrawn from driven shaft engagement and shifted to reversing gear engagement, said means permitting said motor clutch to again move into motor engaging position after the second clutch has been connected with said reversing gear, said second mentioned clutch being constructed to be free of both the driven shaft and the reversing gear in one position to permit said parts to run idly at such a time.

10. In a transmission mechanism of the character described, a forward drive sliding clutch, a reverse drive sliding clutch, two separate clutch shifting levers, a single manually operable cam having two separate portions for moving both of said shifting levers and also having two intermediate portions for holding one of said levers against substantial movement while the other lever is being moved.

11. In a transmission mechanism of the character described, a forward drive sliding clutch, a reverse drive sliding clutch, two separate clutch shifting levers, a single manually operable cam having two separate portions for moving both of said shifting levers and also having two intermediate portions for holding one of said levers against substantial movement while the other lever is being moved, with means to hold all of said parts in a neutral or idle position.

BENJAMIN C. SMITH.